United States Patent
Shibata et al.

(10) Patent No.: US 9,328,690 B2
(45) Date of Patent: May 3, 2016

(54) SYSTEM AND METHOD FOR CONTROLLING FUEL INJECTION TIMING TO DECREASE EMISSIONS DURING TRANSIENT ENGINE OPERATION

(75) Inventors: Jonathan T. Shibata, Whitmore Lake, MI (US); Joshua D. Cowgill, Hartland, MI (US); John Ogalla Waldman, Rochester Hills, MI (US); David P. Sczomak, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/944,044

(22) Filed: Nov. 11, 2010

(65) Prior Publication Data

US 2012/0080009 A1 Apr. 5, 2012

Related U.S. Application Data

(60) Provisional application No. 61/388,879, filed on Oct. 1, 2010.

(51) Int. Cl.
*F02M 69/04* (2006.01)
*F02D 41/40* (2006.01)
*F02D 41/12* (2006.01)
*F02D 41/10* (2006.01)

(52) U.S. Cl.
CPC ............ *F02D 41/401* (2013.01); *F02D 41/126* (2013.01); *F02D 41/10* (2013.01); *F02D 2200/021* (2013.01); *F02D 2200/0404* (2013.01); *F02D 2200/101* (2013.01); *Y02T 10/44* (2013.01)

(58) Field of Classification Search
CPC ..... F02D 41/126; F02D 41/401; F02D 41/10; F02D 2200/0404; F02D 2200/021; F02D 2200/101; Y02T 10/44
USPC .......... 123/445, 478, 480, 492, 493; 701/104, 701/105, 110
See application file for complete search history.

(56) References Cited

U.S. PATENT DOCUMENTS

| | | | |
|---|---|---|---|
| 4,010,717 A | | 3/1977 | Taplin |
| 4,408,279 A | * | 10/1983 | Imai et al. ...................... 701/105 |
| 4,596,221 A | * | 6/1986 | Ament et al. ................. 123/501 |
| 4,635,603 A | | 1/1987 | Hara |
| 4,682,577 A | | 7/1987 | Kato et al. |
| 4,711,216 A | | 12/1987 | Takeuchi et al. |
| 5,183,013 A | * | 2/1993 | Ito et al. ...................... 123/48 R |
| 5,237,975 A | | 8/1993 | Betki et al. |
| 5,243,947 A | | 9/1993 | Yamamoto et al. |
| 5,261,378 A | * | 11/1993 | Fenchel et al. ................ 123/501 |
| 5,355,859 A | | 10/1994 | Weber |
| 5,617,830 A | * | 4/1997 | Ishiwata et al. ............... 123/500 |
| 5,630,402 A | * | 5/1997 | Devine et al. ................. 123/501 |
| 5,809,446 A | * | 9/1998 | Visser ........................... 701/103 |

(Continued)

*Primary Examiner* — John Kwon
*Assistant Examiner* — Johnny H Hoang

(57) ABSTRACT

A control system for an engine includes an injection timing adjustment module and an injection control module. The injection timing adjustment module generates an adjusted fuel injection timing when a fuel request is received and the engine is operating in a transient state, wherein the adjusted fuel injection timing is based on a base fuel injection timing, an elapsed time since the fuel request, and at least one of a plurality of engine operating parameters. The injection control module controls fuel injection based on the adjusted fuel injection timing for a period, and controls fuel injection based on the base fuel injection timing after the period.

26 Claims, 3 Drawing Sheets

(56) References Cited

U.S. PATENT DOCUMENTS

| | | | |
|---|---|---|---|
| 6,325,044 B1 * | 12/2001 | Chen et al. | 123/357 |
| 6,962,140 B1 | 11/2005 | Nakai et al. | |
| 7,066,155 B2 | 6/2006 | Uhde et al. | |
| 7,140,348 B2 * | 11/2006 | Takeuchi et al. | 123/326 |
| 7,246,595 B1 * | 7/2007 | Hoare et al. | 123/294 |
| 7,475,671 B1 * | 1/2009 | Fattic et al. | 123/406.47 |
| 7,624,719 B2 | 12/2009 | Achleitner et al. | |
| 7,715,974 B2 * | 5/2010 | Gibson et al. | 701/103 |
| 7,774,125 B2 | 8/2010 | Scharfenberg | |
| 7,775,191 B2 | 8/2010 | Hou | |
| 7,853,398 B2 | 12/2010 | Hirowatari et al. | |
| 8,042,520 B2 | 10/2011 | Miller et al. | |
| 8,210,156 B2 | 7/2012 | Kokotovic et al. | |
| 8,521,399 B2 * | 8/2013 | Peters et al. | 701/103 |
| 8,539,933 B2 | 9/2013 | Cowgill et al. | |
| 8,645,043 B2 * | 2/2014 | Shibata et al. | 701/103 |
| 2007/0089704 A1 | 4/2007 | Jacobsson et al. | |
| 2008/0196695 A1 | 8/2008 | Storhok et al. | |
| 2008/0264387 A1 | 10/2008 | Spivak | |
| 2009/0071444 A1 | 3/2009 | Takagi et al. | |
| 2009/0234557 A1 | 9/2009 | Hirowatari et al. | |
| 2009/0288638 A1 | 11/2009 | Dintino et al. | |
| 2009/0299610 A1 * | 12/2009 | Kumano et al. | 701/105 |
| 2010/0101536 A1 | 4/2010 | Nakata | |
| 2011/0000463 A1 | 1/2011 | Kokotovic et al. | |
| 2011/0066351 A1 * | 3/2011 | Gallagher et al. | 701/102 |
| 2012/0080009 A1 | 4/2012 | Shibata et al. | |
| 2012/0180763 A1 | 7/2012 | Cowgill et al. | |
| 2012/0185151 A1 | 7/2012 | Shibata et al. | |
| 2012/0185152 A1 | 7/2012 | Shibata et al. | |

* cited by examiner

SYSTEM AND METHOD FOR CONTROLLING FUEL INJECTION TIMING TO DECREASE EMISSIONS DURING TRANSIENT ENGINE OPERATION

CROSS-REFERENCE TO RELATED APPLICATIONS

This application claims the benefit of U.S. Provisional Application No. 61/388,879, filed on Oct. 1, 2010. The disclosure of the above application is incorporated herein by reference in its entirety.

FIELD

The present disclosure relates to internal combustion engines and more particularly to a system and method for controlling fuel injection timing to decrease emissions during transient operation of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel to create an air/fuel (A/F) mixture. In spark ignition, direct injection (SIDI) engines, fuel injectors inject the fuel directly into the cylinders. The cylinders include pistons that compress the A/F mixture. Spark plugs generate spark to ignite the compressed A/F mixture within the cylinders thereby driving the pistons. The movement of the pistons rotatably turns a crankshaft and generates drive torque.

SUMMARY

A control system for an engine includes an injection timing adjustment module and an injection control module. The injection timing adjustment module generates an adjusted fuel injection timing when a fuel request is received and the engine is operating in a transient state, wherein the adjusted fuel injection timing is based on a base fuel injection timing, an elapsed time since the fuel request, and at least one of a plurality of engine operating parameters. The injection control module controls fuel injection based on the adjusted fuel injection timing for a period, and controls fuel injection based on the base fuel injection timing after the period.

A method for controlling an engine includes generating an adjusted fuel injection timing when a fuel request is received and the engine is operating in a transient state, wherein the adjusted fuel injection timing is based on a base fuel injection timing, an elapsed time since the fuel request, and at least one of a plurality of engine operating parameters, controlling fuel injection based on the adjusted fuel injection timing for a period, and controlling fuel injection based on the base fuel injection timing after the period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
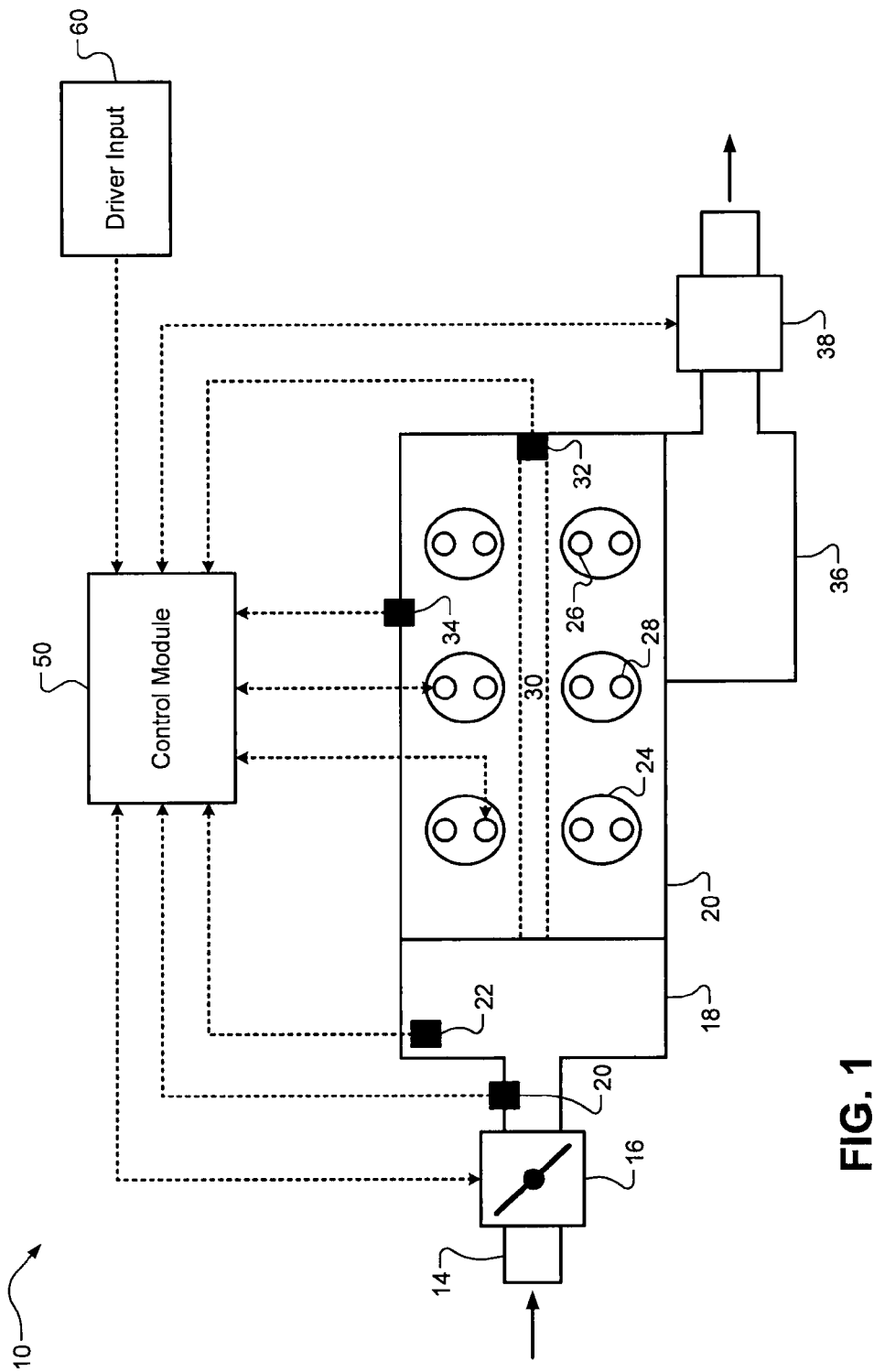
FIG. 1 is a functional block diagram of an engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Spark ignition direct injection (SIDI) engines may inject fuel according to a base fuel injection timing. For example, the base fuel injection timing may include a predetermined fuel injection timing for start of injection (SOI). Specifically, the base fuel injection timing may be calibrated to maximize fuel economy during steady-state operation of the engine. For example only, steady-state operation of the engine may include periods when engine mass air flow (MAF) changes less than a predetermined amount during a predetermined period.

The base fuel injection timing, however, may be too advanced during transient operation of the engine (i.e., not steady-state). For example only, transient operation of the engine may include periods when engine MAF changes more than a predetermined amount during a predetermined period. The base fuel injection timing, therefore, may cause emissions to increase during transient operation of the engine due to fuel impingement.

Accordingly, a system and method are presented for controlling fuel injection timing to decrease emissions during transient operation of an engine. The system and method may detect a fuel request and determine a magnitude of the fuel request. For example, the fuel request may be detected after a deceleration fuel cutoff (DFCO) event or when a driver of the vehicle requests more power via a throttle (driver "tip-in" of the throttle). After detecting and determining the magnitude of the fuel request, the system and method may determine whether the engine is operating in a transient state. For example only, the transient state may include periods when the MAF has changed more than a predetermined amount during a predetermined period.

When the engine is operating in the transient state, the system and method may generate an adjusted fuel injection timing. The adjusted fuel injection timing may be based on the base fuel injection timing (e.g., SOI), an elapsed time since detecting the fuel request, and at least one of a plurality of engine operating parameters. In other words, the adjusted fuel injection timing may include the base fuel injection timing adjusted as a function of the elapsed time since detecting the fuel request and at least one of the plurality of engine operating parameters. For example, the plurality of engine operating parameters may include throttle position, engine load, engine speed, and engine coolant temperature.

The system and method may then control fuel injection based on the adjusted fuel injection timing. Additionally, the system and method may switch from the adjusted fuel injection timing to the base fuel injection timing after a predetermined period. Furthermore, when the engine is operating in the steady-state, the system and method may control fuel injection based on the base fuel injection timing. For example, the steady-state may include periods when the MAF has changed less than a predetermined amount during a predetermined period.

Referring now to FIG. 1, an engine system 10 includes an engine 12. For example, the engine 12 may include a SIDI engine. The engine 12 may also be a different type of engine such as a homogeneous charge compression ignition (HCCI) engine. The engine 12 draws air into an intake manifold 18 through an induction system 14 that may be regulated by a throttle 16. For example, the throttle 16 may be electrically controlled via electronic throttle control (ETC). A MAF sensor 20 measures a MAF rate into the intake manifold 18. A manifold absolute pressure (MAP) sensor 22 measures a pressure of the air in the intake manifold 18.

The air in the intake manifold 18 may be distributed to a plurality of cylinders 24. The engine 12 may include fewer than or greater than six cylinders as shown. Each of the cylinders 24 may include a fuel injector 26 and a spark plug 28. The fuel injector 26 may inject fuel directly into the cylinder 24 to create an A/F mixture. A piston (not shown) within the cylinder 24 may compress the A/F mixture and the spark plug 28 may ignite the compressed A/F mixture. The combustion of the A/F mixture drives the piston (not shown) which rotatably turns a crankshaft 30 generating drive torque.

An engine speed sensor 32 measures a rotational speed of the crankshaft 30 ("engine speed"). For example, the engine speed sensor 32 may measure the engine speed in revolutions per minute (RPM).

An engine temperature sensor 34 measures a temperature of the engine 12. For example, the engine temperature sensor 34 may measure a temperature of engine coolant. Exhaust gas resulting from combustion of the A/F mixture may be expelled from the cylinders 24 into an exhaust manifold 36. An exhaust treatment system 38 may treat the exhaust gas in the exhaust manifold 36. Specifically, the exhaust treatment system 38 may decrease emissions before releasing the exhaust gas into the atmosphere. For example, the exhaust treatment system 38 may include at least one of an oxidation catalyst (OC), a selective catalytic reduction (SCR) system, nitrogen oxide (NOx) absorbers/adsorbers, a particulate matter (PM) filter, and a three-way catalytic converter.

A control module 50 controls the engine system 10. The control module 50 receives signals from the throttle 16, the MAF sensor 20, the MAP sensor 22, the fuel injectors 26, the spark plugs 28, the engine speed sensor 32, the engine temperature sensor 34, and/or the exhaust treatment system 38. The control module 50 controls the throttle 16, the fuel injectors 26, the spark plugs 28, and/or the exhaust treatment system 38. The control module 50 may also implement the system or method of the present disclosure.

Figure 2:
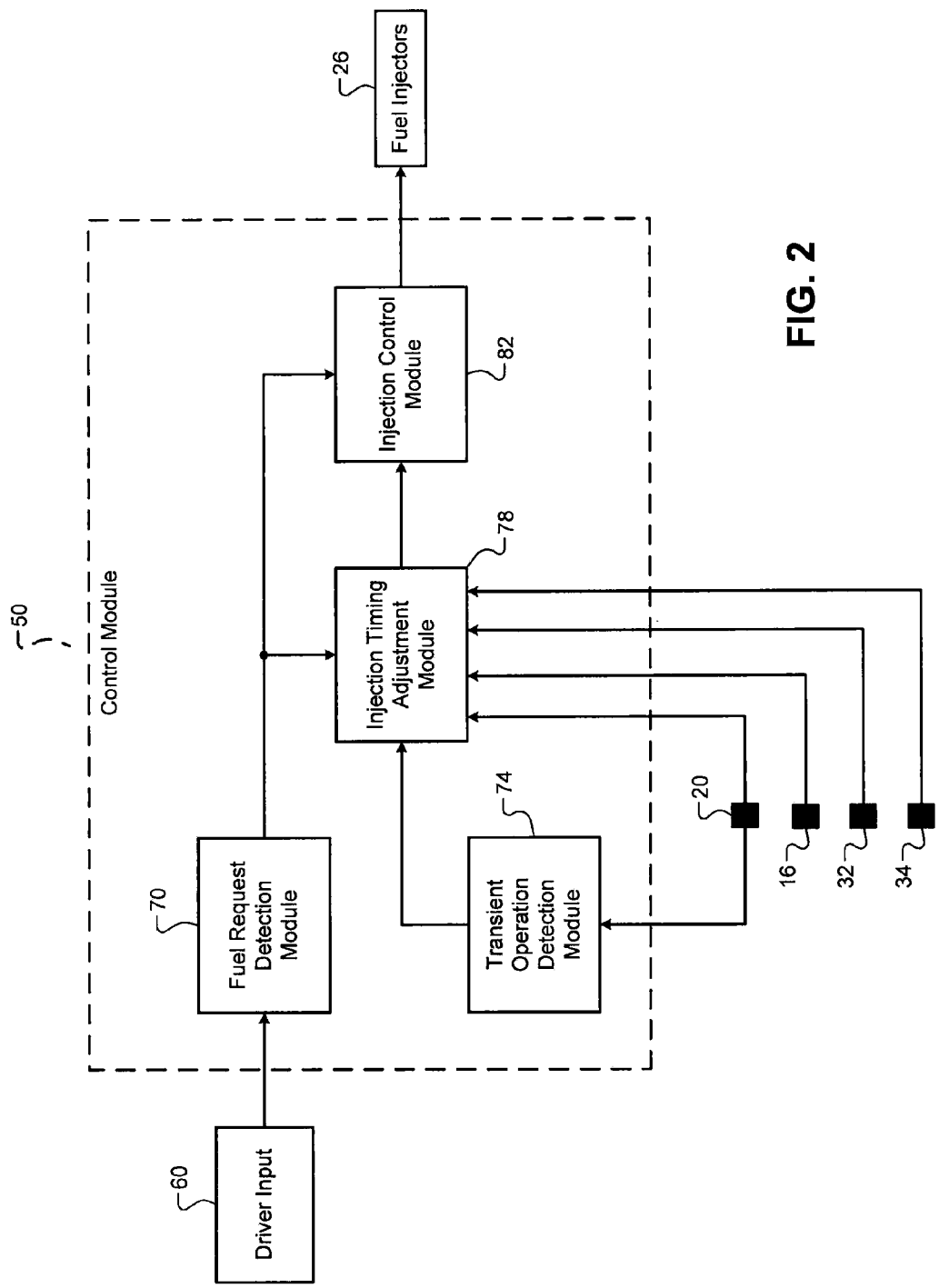
FIG. 2 is a functional block diagram of a control module according to one implementation of the present disclosure.

Referring now to FIG. 2, the control module 50 includes a fuel request detection module 70, a transient operation detection module 74, an injection timing adjustment module 78, and an injection control module 82.

The fuel request detection module 70 detects a fuel request based on driver input 60. Specifically, the fuel request may be detected based on a magnitude of driver input 60. For example, the fuel request may occur after a DFCO event or in response to a driver tip-in of the throttle 16. The fuel request detection module 70 may also initialize and start a timer when the fuel request is detected. The timer may represent an elapsed time since detection of the fuel request.

The transient operation detection module 74 detects when the engine 12 is operating in the transient state. For example, the transient operation detection module 74 may detect that the engine 12 is operating in the transient state when the MAF rate into the engine 12 has changed more than a predetermined amount during a predetermined period. The transient operation detection module 74, however, may also detect transient operation of the engine 12 based on other engine operating parameters. When transient operation is detected, the transient operation detection module 74 may generate a signal for the injection timing adjustment module 78.

The injection timing adjustment module 78 receives the signal indicating detection of transient operation. The injection timing adjustment module 78 also receives the elapsed time since detection of the fuel request from the fuel request detection module 70. The injection timing adjustment module 78 may also receive signals indicating a plurality of engine operating parameters. For example, the injection timing adjustment module 78 may receive signals from the throttle 16 (e.g., a throttle position sensor, or TPS), the MAF sensor 20, the engine speed sensor 32, and the engine coolant temperature sensor 34 indicating throttle position, engine load, engine speed, and engine temperature, respectively.

Specifically, the adjusted fuel injection timing may be modified (i.e., advanced or retarded) in relation to the base fuel injection timing based on one or more of the plurality of engine operating parameters and corresponding thresholds. For example, the fuel injection timing may be retarded in relation to the base fuel injection timing when the one or more of the plurality of engine operating parameters is less than corresponding threshold(s). More specifically and for example only, when throttle position is less than a predetermined threshold the adjusted fuel injection timing may be retarded in relation to the base fuel injection timing. Additionally, the adjusted fuel injection timing may then be returned to the base fuel injection timing as the elapsed time since detection of the fuel request increases.

The injection control module 82 may then control fuel injection based on one of the base fuel injection timing and the adjusted fuel injection timing. Specifically, the injection control module 82 may control fuel injection based on the base fuel injection timing during steady-state operation and based on the adjusted fuel injection timing during transient operation. The injection control module 82 may generate control signals to control the fuel injectors 26. For example, the control signals may include pulse-width modulated (PWM) signals. The control signals, however, may also be other suitable types of fuel injector control signals.

Figure 3:
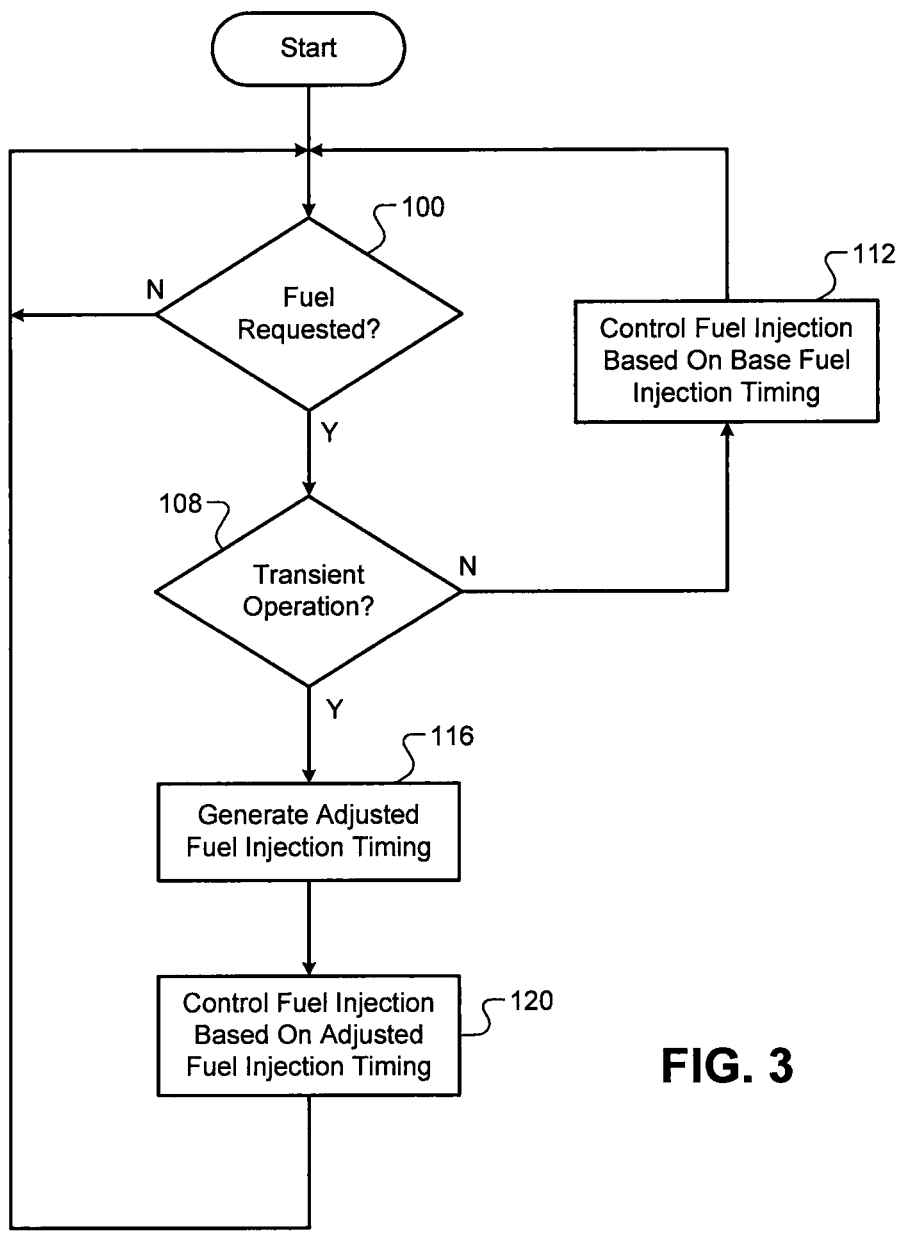
FIG. 3 is a flow diagram of a method for controlling fuel injection timing to decrease emissions during transient operation of an engine according to one implementation of the present disclosure.

Referring now to FIG. 3, a method for adjusting fuel injection timing to decrease emissions during transient operation of an engine begins at 100. At 100, control detects whether fueling is requested. If true, control may proceed to 104. If false, control may return to 100. At 104, control determines whether the engine is operating in a transient state. If false, control may proceed to 108. If true, control may proceed to 112. At 108, control may control fuel injection based on the base fuel injection timing. Control may then return to 100.

At 112, control may generate an adjusted fuel injection timing based on the base injection timing, an elapsed time since detection of the fuel request and at least one of the plurality of engine operating parameters. For example, the plurality of engine operating parameters may include throttle position, engine load, engine speed, and engine coolant temperature. At 116, control may actuate fuel injection based on the adjusted fuel injection timing. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
an injection timing adjustment module that:
generates an adjusted fuel injection timing when a fuel increase request is received and the engine is operating in a transient state, wherein the adjusted fuel injection timing is advanced or retarded relative to a base fuel injection timing; and
determines whether to advance or retard the adjusted fuel injection timing relative to the base fuel injection timing based on at least one of throttle position, engine load, and engine coolant temperature; and
an injection control module that controls fuel injection based on the adjusted fuel injection timing for a first period, and that controls fuel injection based on the base fuel injection timing after the first period.

2. The control system of claim 1, wherein the injection timing adjustment module determines whether to advance or retard the adjusted fuel injection timing relative to the base fuel injection timing based on the throttle position, the engine load, engine speed, and the engine coolant temperature.

3. The control system of claim 1, wherein the injection control module controls fuel injection based on the base fuel injection timing when the engine transitions from transient operation to steady-state operation.

4. The control system of claim 3, wherein the steady-state operation includes periods when mass air flow (MAF) into the engine has changed less than a predetermined amount during a predetermined period.

5. The control system of claim 1, wherein the first period is a predetermined period.

6. The control system of claim 1, wherein the injection control module returns fuel injection timing from the adjusted fuel injection timing to the base fuel injection timing during a second period after the engine transitions to steady-state operation.

7. The control system of claim 1, wherein the transient state includes periods when mass air flow (MAF) into the engine has changed more than a predetermined amount during a predetermined period.

8. The control system of claim 1, wherein the base fuel injection timing is a predetermined fuel injection timing corresponding to start of injection (SOI).

9. The control system of claim 1, wherein the fuel increase request is in response to an end of a deceleration fuel cutoff (DFCO) event.

10. The control system of claim 1, wherein the injection timing adjustment module generates the adjusted fuel injection timing further based on an elapsed time since detection of the fuel increase request.

11. The control system of claim 1, wherein injection timing adjustment module determines whether to advance or retard the adjusted fuel injection timing relative to the base fuel injection timing based on (i) the engine load and the engine coolant temperature and (ii) thresholds corresponding to the engine load and the engine coolant temperature.

12. The control system of claim 1, wherein injection timing adjustment module determines whether to advance or retard the adjusted fuel injection timing relative to the base fuel injection timing based on (i) the at least one of the throttle position, the engine load, and the engine coolant temperature and (ii) a threshold corresponding to the at least one of the throttle position, the engine load, and the engine coolant temperature.

13. The control system of claim 12, wherein the injection timing adjustment module retards the adjusted fuel injection timing relative to the base fuel injection timing when the at least one of the throttle position, the engine load, and the engine coolant temperature is less than the threshold.

14. A method for controlling an engine, comprising:
generating an adjusted fuel injection timing when a fuel increase request is received and the engine is operating in a transient state, wherein the adjusted fuel injection timing is advanced or retarded relative to a base fuel injection timing;
determining whether to advance or retard the adjusted fuel injection timing relative to the base fuel injection timing based on at least one of throttle position, engine load, and engine coolant temperature;
controlling fuel injection based on the adjusted fuel injection timing for a first period; and
controlling fuel injection based on the base fuel injection timing after the first period.

15. The method of claim 14, further comprising determining whether to advance or retard the adjusted fuel injection timing relative to the base fuel injection timing based on the throttle position, the engine load, engine speed, and the engine coolant temperature.

16. The method of claim 14, further comprising controlling fuel injection based on the base fuel injection timing when the engine transitions from transient operation to steady-state operation.

17. The method of claim 16, wherein the steady-state operation includes periods when mass air flow (MAF) into the engine has changed less than a predetermined amount during a predetermined period.

18. The method of claim 14, wherein the first period is a predetermined period.

19. The method of claim 14, further comprising returning fuel injection timing from the adjusted fuel injection timing to the base fuel injection timing during a second period after the engine transitions to steady-state operation.

20. The method of claim 14, wherein the transient state includes periods when mass air flow (MAF) into the engine has changed more than a predetermined amount during a predetermined period.

21. The method of claim 14, wherein the base fuel injection timing is a predetermined fuel injection timing corresponding to start of injection (SOI).

22. The method of claim 14, wherein the fuel increase request is in response to an end of a deceleration fuel cutoff (DFCO) event.

23. The method of claim 14, further comprising generating the adjusted fuel injection timing further based on an elapsed time since detection of the fuel increase request.

24. The method of claim 14, further comprising determining whether to advance or retard the adjusted fuel injection timing relative to the base fuel injection timing based on (i) the engine load and the engine coolant temperature and (ii) thresholds corresponding to the engine load and the engine coolant temperature.

25. The method of claim 14, further comprising determining whether to advance or retard the adjusted fuel injection timing relative to the base fuel injection timing based on (i) the at least one of the throttle position, the engine load, and he engine coolant temperature and (ii) a threshold corresponding to the at least one of the throttle position, the engine load, and the engine coolant temperature.

26. The method of claim 25, further comprising retarding the adjusted fuel injection timing relative to the base fuel injection timing when the at least one of the throttle position, the engine load, and the engine coolant temperature is less than the threshold.

* * * * *